March 23, 1926.
I. B. GILBERT
AUTOMATIC REGRINDING VALVE
Filed Oct. 19, 1922.
1,577,964
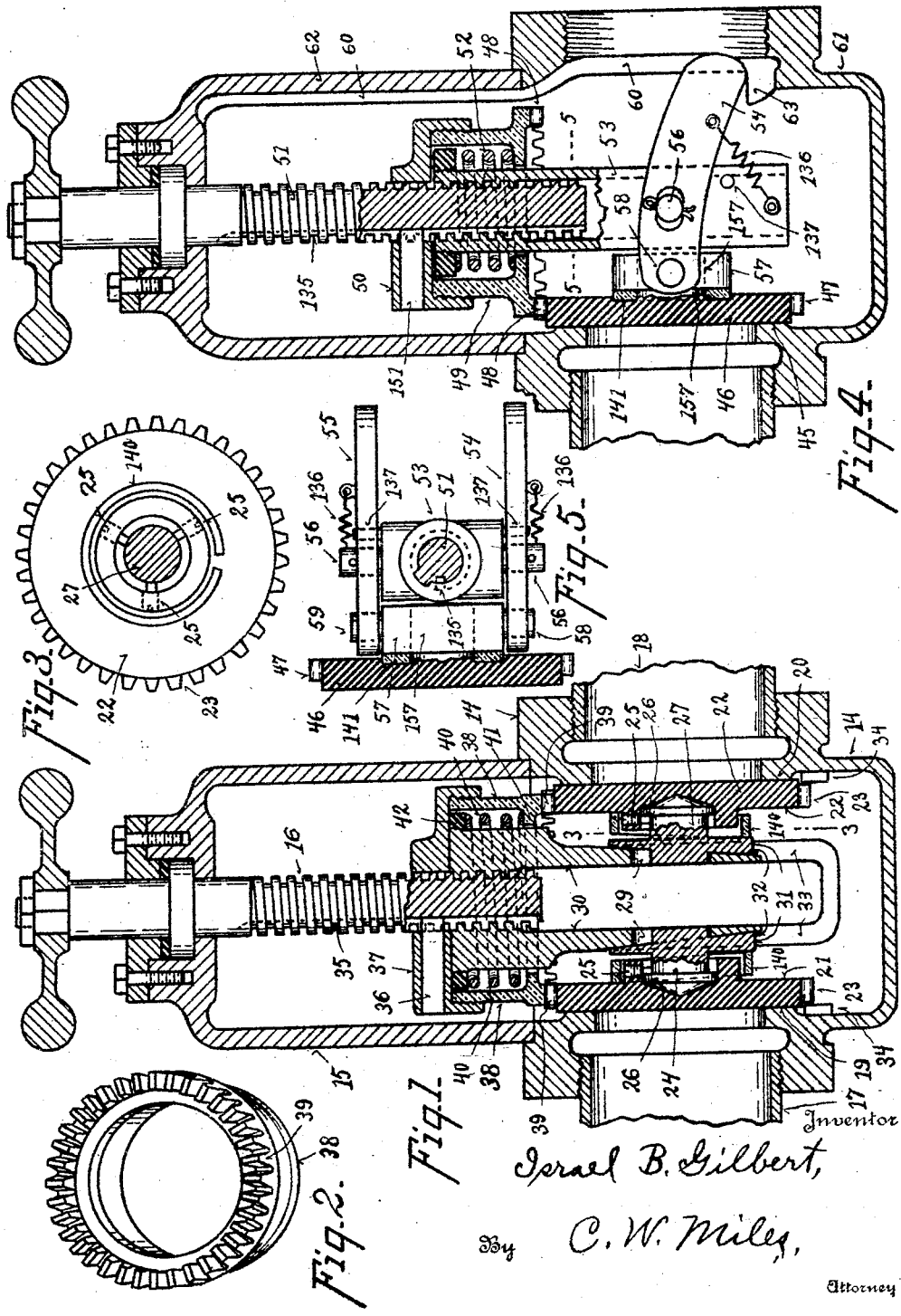
Inventor
Israel B. Gilbert,
By C. W. Miles,
Attorney Patented Mar. 23, 1926.

1,577,964

UNITED STATES PATENT OFFICE.

ISRAEL B. GILBERT, OF CINCINNATI, OHIO.

AUTOMATIC REGRINDING VALVE.

Application filed October 19, 1922. Serial No. 595,523.

*To all whom it may concern:*

Be it known that I, ISRAEL B. GILBERT, a citizen of the United States, residing at Cincinnati, in the county of Hamilton and State of Ohio, have invented certain new and useful Improvements in Automatic Regrinding Valves, of which the following is a specification.

My invention relates to improvements in self-grinding gate valves. One of its objects is to provide an improved gate valve in which the valve disk or valve disks are adapted to be given a partial turn or one or more full turns upon their seats under sufficient tension to cause the contact faces or valve seats to wear evenly and to remain true for long periods of time. Another object is to provide improved self-grinding mechanism for gate valves. My invention also comprises certain details of form and combination of components, all of which will be fully set forth in the description of the accompanying drawings in which:

Fig. 1, is a central vertical section through a gate valve illustrating the application of my invention to a gate valve having two valve disks and seats therefor.

Fig. 2, is a perspective view of a detached gear sleeve employed to rotate the valve disk.

Fig. 3, is a sectional detail of one of the valve disks, taken on line 3—3 of Fig. 1.

Fig. 4, is a view similar to Fig. 1, illustrating a modification in which only one valve disk and valve seat are employed.

Fig. 5, is a sectional detail of the valve disk and its seating apparatus detached, taken on line 5—5 of Fig. 4.

The accompanying drawings illustrate the preferred embodiments of my invention in Figs. 1, 2, and 3 of which 14 represents a gate valve casing provided with a detachable bonnet 15, and a valve stem or spindle 16. The valve casing is designed to be interposed between and connected to pipe sections 17 and 18. As illustrated in Fig. 1, the valve casing is provided with two opposed flat or plane valve seats 19 and 20 to be engaged simultaneously by valve disks 21 and 22. Each of the valve disks 21 and 22 is provided at its periphery with a series of gear teeth 23. The valve disk 21 is rotatably mounted upon a cylindrical stem 24 upon which the valve is held in place by means of one or more screws 25 engaging for instance a shoulder 26 upon the stem 24. The valve disk 22 is rotatably mounted upon a cylindrical stem 27 substantially as heretofore described for the valve disk 21.

I preferably employ coiled springs 140, or equivalent means having a limited yielding movement to yieldingly initially press the valve disks 21 and 22 to their seats 19 and 20 with sufficient pressure to secure an effective self-grinding action without disengaging the driving member 38 from driving engagement with the valve disks and previously to the application of positive and maximum pressure to the valve disks through the stem 16 and nut 30. The use of member 140 provides for a greater length of self-grinding movement of the valve disks in contact with the valve seats than would otherwise be attainable.

The stems 24 and 27 project through recesses 29 in a nut or frame 30 which is threaded to or otherwise actuated by the valve stem to move said frame 30 into position between the valve seats 19 and 20 or into a position in the interior of the bonnet to uncover the ports through the valve casing. Each of the stems 24 and 27 is provided with a carriage 31 having an inclined face to engage and travel for a limited distance upon the inclined ways 32 of the nut 30, while the side rails 33 of nut 30 hold the carriages 31 in non-rotatable alignment upon and relative to the nut 30. The nut 30 is thereby enabled to act as a wedge when forced downwardly and to firmly press and lock the valve disks 21 and 22 to their seats 19 and 20. The seats 19 and 20 may be slightly inclined one to another or if desired may be in parallel planes. As illustrated in Fig. 1, as the frame 30 and valve disks 21 and 22 are lowered by the valve stem into position opposite the valve seats 19 and 20 the lower edges of the valve disks lightly engage the stop lugs or stop rollers 34 which prevent further descent of the valve disks 21 and 22, thereby enabling the wedge shaped frame 30 to force the stems 24 and 27 apart, and to gradually apply increased pressure upon the valve disks to close the valve.

The valve stem is provided with a spline 35 engaged by a key 36 carried by a collar 37 loosely mounted upon said valve stem and caused to rotate therewith by means of the spline 35 and key 36. A sleeve 38 is threaded at one end to the collar 37 and at its opposite end is provided with a series of gear teeth 39 which gear teeth are in position to mesh with the gear teeth on the respective valve disks 21 and 22 to thereby cause the valve disks 21 and 22 to normally rotate upon and relative to the stems 24 and 27 when the valve stem 16 is rotated. A coiled spring 40 is interposed between a shoulder 41 on the sleeve 38 and a collar 42 threaded to the upper end of the frame 30, which spring serves to hold the collar 37 and sleeves 38 yieldingly in engagement with the upper end of frame 30, and at the same time to yieldingly hold the gear teeth of the sleeve 38 in engagement with the gear teeth of the valve disks 21 and 22 to cause the valve disks to rotate when the valve stem 16 is rotated.

When the valve disks 21 and 22 first come in contact with the valve seats 19 and 20, the energy of spring 40 is sufficient to cause said disk valves to make one or more complete revolutions while in contact under considerable strain with the faces of the valve seats 19 and 20 to thereby cause a self-grinding action between the faces of said valve disks and their valve seats, and to change the relative positions of said valve disks upon their seats at each operation of the valve. After the valve disks have seated and made a certain amount of rotary motion upon and in contact with their respective valve seats, the gradually increased pressure applied by the wedge frame 30 to hold the valves upon their seats develops sufficient frictional resistance to the movement of said disk valves upon their seats to cause said valve disks to cease to rotate and to cause the spring 40 to yield and the gear teeth of the sleeve to yield and climb the gear teeth of the disk valves thereby permitting the valve stem 16 to be turned a sufficient distance further to force the frame 30 downwardly until the valve disks are each firmly locked to its seat. As soon as the valve stem is turned in reverse direction excessive pressure upon the valve disks is released and the gear teeth of the sleeve 38 proceed to engage and drive the gear teeth of the valve disks, and to rotate the valve disks in the reverse direction one or more revolutions before contact between said valve disks and their seats is broken, thereby securing a reversed self-grinding action each time the valve is closed and opened. The gear teeth 23 and 39 may be especially shaped to facilitate climbing and slippage.

In the modification Figs. 4, and 5 only one valve seat 45 and one disk valve 46 are employed. The valve disk is provided with gear teeth 47 substantially as shown in Fig. 3, and said teeth 47 are engaged by gear teeth 48 carried upon a sleeve 49 substantially as shown in Fig. 2, and the sleeve 49 is attached to a collar 50 splined to the valve stem 51 by means of a key 151 entering a spline recess 135 substantially as heretofore described. A coiled spring 52 corresponding to the spring 40 is employed to hold said gear teeth yieldingly in engagement, and a spring member 141 corresponding to the yielding member 140 of Figs. 1 and 3.

A sleeve 53 is employed in place of the frame 30 of Fig. 1, and is threaded to the valve stem 51. A pair of arms 54 and 55 are pivotally mounted upon studs 56 projecting from opposite sides of the sleeve 53 through slotted openings in the arms 54 and 55. A collar 57 is rotatably mounted upon a stud 157 projecting from the rear face of the valve disk, and said collar 57 is provided with studs 58 and 59 by means of which the arms 54 and 55 are pivotally connected to said collar 57. The opposite ends of the arms 54 and 55 are designed to ride in grooved ways 60 on the inside of the valve casing 61 and bonnet 62, and to engage shelves 63 at the lower ends of said ways 60 to thereby act as levers to gradually thrust the valve disk 46 into engagement with its valve seat 45 and to lock it in that position. The gear teeth 48 of the sleeve 49 serve to engage the gear teeth 47 to rotate the valve relative to its collar 57 one or more revolutions after the valve disk has contacted with its seat 45, after which the spring 52 yields substantially as heretofore described. The valve 46 is thus rotated first in one direction and then in another upon its seat at each operation of closing and opening the valve.

The apparatus herein shown and described is capable of considerable modification within the scope of the claims without departing from the spirit of my invention.

What I claim is:

1. A gate valve comprising a valve casing having a valve seat, a valve disk movable to cover and uncover said seat to open and close said valve, a valve stem operable to adjust said valve disk to and from said valve seat, said valve disk being rotatably mounted relative to said valve stem, and means mounted yieldingly relative to said valve stem in driving relation with said valve disk to intermittently cause said valve disk to rotate in contact with the face of said valve seat under moderate pressure from said valve stem, and to automatically cease to rotate when the pressure from said valve stem approaches its maximum.

2. A gate valve comprising a valve casing having a valve seat, a valve disk to engage said seat to close said valve, a valve stem operable to adjust said valve disk to and from said valve seat, said valve disk being rotatably mounted relative to said valve stem, driving means mounted yieldingly relative to said valve stem to normally rotate said valve disk from said valve stem, and means operable through pressure of said valve disk upon said valve seat to enable said valve stem to rotate independently of said valve disk.

3. A gate valve comprising a valve casing having a valve seat, a valve disk rotatably mounted and movable transversely to cover and uncover said valve seat, a valve stem operable to adjust said valve disk to and from said valve seat, a driving member carried by said valve stem to interlock with and rotate said valve disk, and means to yieldingly hold said driving member and valve disk normally interlocked, said yielding means yielding automatically to release said interlocking connection when the frictional engagement between the valve disk and valve seat approaches a maximum.

4. A gate valve comprising a valve casing having a valve seat, a valve disk to engage said seat to close said valve, a valve stem operable to adjust said valve disk to and from said valve seat, said valve disk being rotatably mounted relative to said valve stem, gear teeth on said valve disk, a gear mounted upon said valve stem and provided with gear teeth to engage the gear teeth upon said valve disk to normally rotate said valve disk from said valve stem, and clutch means to yieldingly release said valve disk from driving relation with said valve stem when the frictional engagement of said valve disk with its seat approaches a maximum.

5. A gate valve comprising a valve casing having a valve seat, a valve disk to engage said seat to close said valve, a valve stem operable to adjust said valve disk to and from said valve seat, said valve disk being rotatably mounted relative to said valve stem, a driving member interposed between said valve disk and said valve stem to normally rotate said valve disk from said valve stem, and automatically actuated mechanism to release said valve disk from driving relation with said valve stem when the frictional engagement of said valve disk with its seat approaches a maximum, and to automatically reengage said valve disk in driving relation with said valve stem when the frictional engagement of said valve disk with said valve seat is decreased.

6. A gate valve comprising a valve casing having opposed valve seats, opposed valve disks movable transversely to cover and uncover said valve seats, a valve stem, a frame located between said valve disks and adjustable within said valve casing through operation of said valve stem, means carried by said frame to rotatably and movably support said valve disks, a driving member mounted upon and having splined relation with said valve stem and having interlocking engagement with said valve disks respectively to normally rotate said valve disks from said valve stem and means to yieldingly hold said driving member in interlocking relation with said valve disks and adapted to automatically release said driving member from driving relation with said valve disks when the frictional engagement of said valve disks with said valve seat approaches a maximum.

7. A valve comprising a valve casing having a valve seat, a valve stem, a valve disk rotatably mounted relative to said valve stem and adjustable through said valve stem into and out of engagement with said valve seat, and a driving member mounted upon and rotatable with said valve stem and yieldingly held in driving relation with said valve disk to rotate said valve disk in frictional contact with said valve seat when said valve disk is being applied to and removed from said valve seat and to automatically disengage its driving relation with said valve disk when the closing strain on said valve disk approaches a maximum.

8. A valve comprising a valve casing having a valve seat, a valve stem, a valve disk rotatably mounted relative to said valve stem and adjustable through said valve stem into and out of engagement with said valve seat, means interposed between said valve disk and said valve stem to initially apply said valve disk to said valve seat with a yielding force, and a driving member mounted upon and rotatable with said valve stem and yieldingly held in driving relation with said valve disk to rotate said valve disk in frictional contact with said valve seat, when said valve disk is being applied to and removed from said valve seat, and to automatically disengage its driving relation with said valve disk when the closing strain on said valve disk approaches a maximum.

9. A valve comprising a valve casing having a valve seat, a valve stem, a valve disk rotatably mounted relative to said valve stem and adjustable through said valve stem into and out of engagement with said valve seat, and a driving member mounted upon and having splined relation with said valve stem and yieldingly held in driving relation with said valve disk to rotate said valve disk in frictional contact with said valve seat, when said valve disk is being applied to and removed from said valve seat, and to automatically disengage its driving relation with said valve disk when the closing strain on said valve disk approaches a maximum.

In testimony whereof I have affixed my signature.

ISRAEL B. GILBERT.